US007299026B2

(12) United States Patent
Hayashi

(10) Patent No.: US 7,299,026 B2
(45) Date of Patent: Nov. 20, 2007

(54) METHOD AND APPARATUS FOR INTERFERENCE CANCELLATION PERFORMING LEVEL ADJUSTMENT PROCESSING FOR STANDARDIZING A CHANNEL ESTIMATION VALUE BETWEEN OPERATIONS OF CHANNEL ESTIMATION PROCESSING AND JOINT DETECTION OPERATION PROCESSING

(75) Inventor: Masaki Hayashi, Yokosuka (JP)

(73) Assignee: Matsushita Electric Industrial Co., Ltd, Osaka (JP)

( * ) Notice: Subject to any disclaimer, the term of this patent is extended or adjusted under 35 U.S.C. 154(b) by 432 days.

(21) Appl. No.: 10/466,834

(22) PCT Filed: Aug. 5, 2002

(86) PCT No.: PCT/JP02/07958

§ 371 (c)(1),
(2), (4) Date: Jul. 22, 2003

(87) PCT Pub. No.: WO03/017511

PCT Pub. Date: Feb. 27, 2003

(65) Prior Publication Data

US 2004/0058713 A1 Mar. 25, 2004

(30) Foreign Application Priority Data

Aug. 9, 2001 (JP) ............................ 2001-242798

(51) Int. Cl.
*H04B 1/10* (2006.01)

(52) U.S. Cl. ....................... 455/296; 455/303; 455/312

(58) Field of Classification Search ................ 455/296, 455/303, 310; 370/342, 441, 335, 389; 375/316, 375/229

See application file for complete search history.

(56) References Cited

U.S. PATENT DOCUMENTS 4,852,090 A * 7/1989 Borth ......................... 370/347
5,724,378 A 3/1998 Miki et al.

(Continued)

FOREIGN PATENT DOCUMENTS

EP 1077551 2/2001

(Continued)

OTHER PUBLICATIONS

H. Karimi, "Efficient Multi-Rate Multi-User Detection for the Asynchronous WCDMA Uplink", IEEE 1999, pp. 593-597.

*Primary Examiner*—Duc M. Nguyen
*Assistant Examiner*—Eric J Elcenko
(74) *Attorney, Agent, or Firm*—Stevens, Davis, Miller & Mosher, LLP

(57) ABSTRACT

From a delay profile, path selectors 105$a$~105$n$ discard the signals other than those corresponding to valid paths, such as noise, output the channel values, which are obtained through the selection of valid paths alone, to JD decoder 106, and output the received levels of the valid paths to multipliers 108$a$~108$n$. JD decoder 106 performs joint detection operation and multiplies the operation result by a received signal that is output from delayer 103. Allocator 107 separates the soft decision data of individual users on a per user basis. Multipliers 108$a$~108$n$ multiply outputs of JD decoder and received levels output of path selectors 105$a$~105$n$. Error correction decoder 109$a$~109$n$ performs the hard decision of the soft decision data so as to obtain each user's demodulation data.

6 Claims, 10 Drawing Sheets

U.S. PATENT DOCUMENTS 5,740,208 A * 4/1998 Hulbert et al. .............. 375/346
5,757,791 A * 5/1998 Kanterakis et al. ......... 370/342
5,933,768 A * 8/1999 Skold et al. ................ 455/296
6,069,912 A * 5/2000 Sawahashi et al. ......... 375/142
6,212,243 B1 * 4/2001 Klein et al. ................. 375/316
6,240,099 B1 5/2001 Lim et al.
6,301,289 B1 * 10/2001 Bejjani et al. .............. 375/144
6,584,143 B2 * 6/2003 Yu ............................. 375/147
6,741,637 B1 * 5/2004 Shen et al. ................. 375/149
6,760,567 B1 * 7/2004 Jeong et al. ............. 455/67.11
6,904,076 B1 * 6/2005 Tsutsui et al. .............. 375/130
6,963,546 B2 * 11/2005 Misra et al. ................ 370/294
2002/0003834 A1 * 1/2002 Yoshimura .................. 375/147
2002/0015438 A1 * 2/2002 Ishizu et al. ................ 375/147
2002/0159547 A1 * 10/2002 Lindoff et al. .............. 375/343
2004/0252796 A1 * 12/2004 Dabak et al. ............... 375/347

FOREIGN PATENT DOCUMENTS

JP 09064846 3/1997
JP 11136212 5/1999
JP 2000 261412 9/2000

* cited by examiner

METHOD AND APPARATUS FOR INTERFERENCE CANCELLATION PERFORMING LEVEL ADJUSTMENT PROCESSING FOR STANDARDIZING A CHANNEL ESTIMATION VALUE BETWEEN OPERATIONS OF CHANNEL ESTIMATION PROCESSING AND JOINT DETECTION OPERATION PROCESSING

TECHNICAL FIELD

The present invention relates to apparatus and methods for interference cancellation. More particularly, the present invention relates to an apparatus and method for interference cancellation that is particularly suitable for use with radio receiving apparatus.

BACKGROUND ART

Typically, methods for acquiring decoded signals by removing various types of interference including interference due to multi-path fading, inter-symbol interference, and multiple access interference and the like, adopt joint detection decoding.

Joint detection decoding is an example of a decoding method that utilizes matrix operation. That is, in joint detection decoding, predetermined matrix operation is executed using a system matrix in which convolutional operation results of the channel estimation values of individual communication terminals (users) and the spread codes that are assigned to the communication terminals (users) are provided in matrix, and the matrix operation results are multiplied by a received signal's data portion so that interference is cancelled and decoded data is obtained. Thus joint detection decoding such as above obtains decoded data wherefrom interference is cancelled. Compared to RAKE combining, joint detection decoding is characterized by high performance of interference cancellation and high reliability of decoded data.

However, with conventional joint detection apparatus, when a signal (i.e. code, frame) of a high received level and a signal (i.e. code, frame) of a low received level are subjected to joint detection decoding, their signal levels become substantially the same as a result. These signal levels do not reflect the signals' likelihood, and when an error correction decoding scheme is employed that uses the scale of decoding result for likelihood information, the accuracy of error correction does not improve.

DISCLOSURE OF INVENTION

It is therefore one of the primary objects of the present invention to provide an apparatus and method for interference cancellation that achieves improved accuracy of error correction when an error correction decoding scheme utilizes joint detection decoding results.

In order to achieve the above object, an interference cancellation apparatus that performs the joint detection decoding of received signals uses a received signal's level as likelihood, and performs error correction and thus achieves improved reception performance.

BEST MODE FOR CARRYING OUT THE INVENTION

The present inventor has arrived at the instant invention by focusing attention on that joint detection operation produces results that have similar signal levels, thereby making it difficult to determine the likelihood of a signal from its signal level, and, when such error correction is employed that uses the signal level as information on likelihood, the accuracy of error correction decreases.

The essence of the present invention is that an interference cancellation apparatus, which performs the joint detection decoding of received signals, improves reception performance by performing error correction using a received signal's level as likelihood.

Now, embodiments of the invention will be described below with reference to the accompanying drawings.

EMBODIMENT 1

A case will be described here with the first embodiment of the invention where a received signal is subjected to joint detection calculation, the operation result is assigned weight according to the received level, and error correction is performed using the received level as likelihood information, so as to achieve improved reception characteristics.

Figure 1:
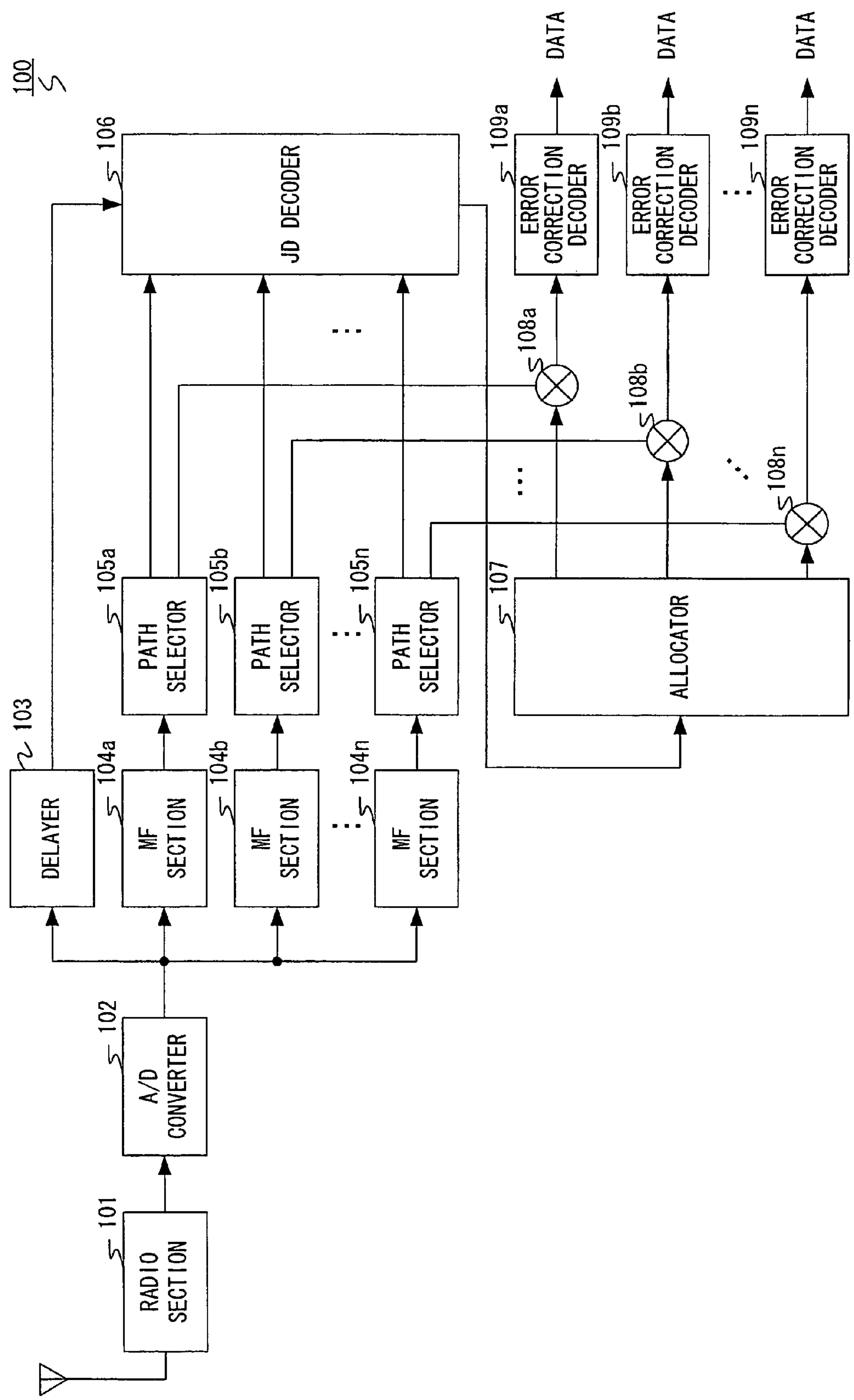
FIG. 1 is a block diagram showing a configuration of an interference cancellation apparatus according to the first embodiment of the invention.

FIG. 1 is a block diagram showing a configuration of an interference cancellation apparatus according to the first embodiment of the invention. Interference canceller 100 of FIG. 1 comprises radio section 101, A/D converter 102, delayer 103, MF sections 104*a*~104*n*, path selectors 105*a*~105*n*, JD decoder 106, allocator 107, multipliers 108*a*~108*n*, and error correction decoders 109*a*~109*n*.

Referring to FIG. 1, radio section 101 receives a radio signal, performs the radio processing thereof such as conversion into baseband frequency, and outputs the received signal to A/D converter 102. A/D converter 102 performs the analog-digital conversion of the received signal and outputs it onto delayer 103 and MF sections 104*a*~104*n*. Delayer 103 delays the received signal until the processing timing in JD decoder 106. MF sections 104*a*~104*n* respectively make a delay profile by multiplying the received signal by each channel's spread code, and output them onto path selectors 105_a_~105_n_.

Incidentally, although the above description shows a configuration comprising n of MF sections 104_a_~104_n_, such configuration is also possible where a single MF makes n delay profiles.

From the delay profiles, path selectors 105_a_~105_n_ discard the signals other than those corresponding to the valid paths, such as noise, and output the channel estimation values acquired through selection of the valid paths, to JD decoder 106. In addition, path selectors 105_a_~105_n_ output the received levels in path selectors 105_a_~105_n_ to multipliers 108_a_~108_n_.

It is also possible to provide path selectors 105_a_~105_n_ with means for time-averaging the delay profiles so as to enable path selection based on the averaged delay profile.

JD decoder 106 performs predetermined matrix operation using a system matrix, in which the convolutional operation results of the channel estimation values of individual communication terminals (users) and the spread codes assigned to the communication terminals (users) are provided in matrix, multiplies the operation results by the received signal output from delayer 103, and outputs each user's soft decision data wherefrom interference has been cancelled to allocator 107.

The soft decision data is distributed from allocator 107 to the individual users, and then output to multipliers 108_a_~108_n_ on a per user basis. Multipliers 108_a_~108_n_ multiply the users'soft decision data by the received level output from path selectors 105_a_~105_n_ and thus assign weight, and output them to error correction decoders 109_a_~109_n_.

Error correction decoders 109_a_~109_n_ perform the hard decision of the soft decision data, and obtain decoded data #1~decoded data #n of the users. For example, error correction decoders 109_a_~109_n_ perform error correction decoding such as viterbi decoding that uses the scale of decoding result as likelihood information.

Figure 2A:
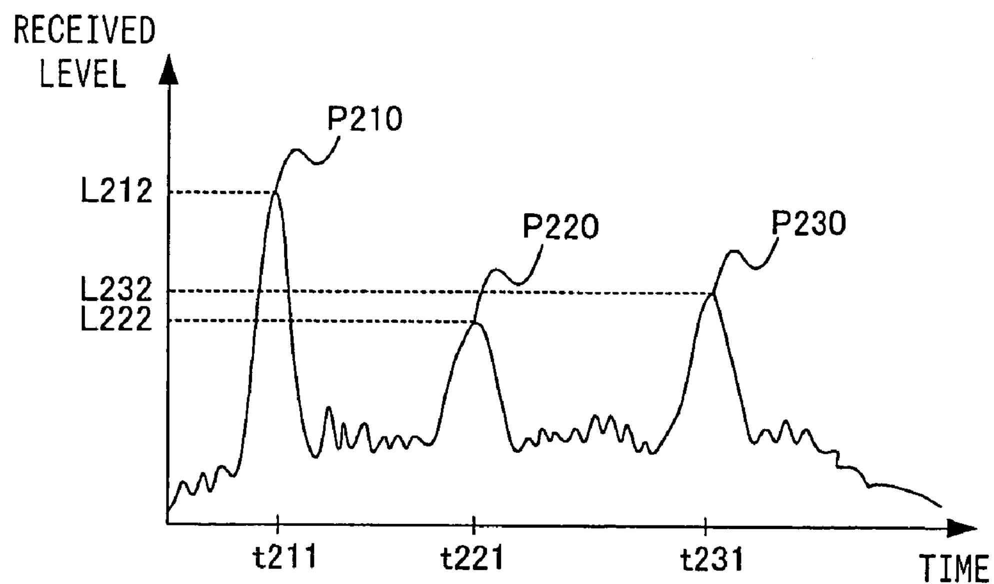
FIG. 2A shows an example of delay profile.
Figure 2B:
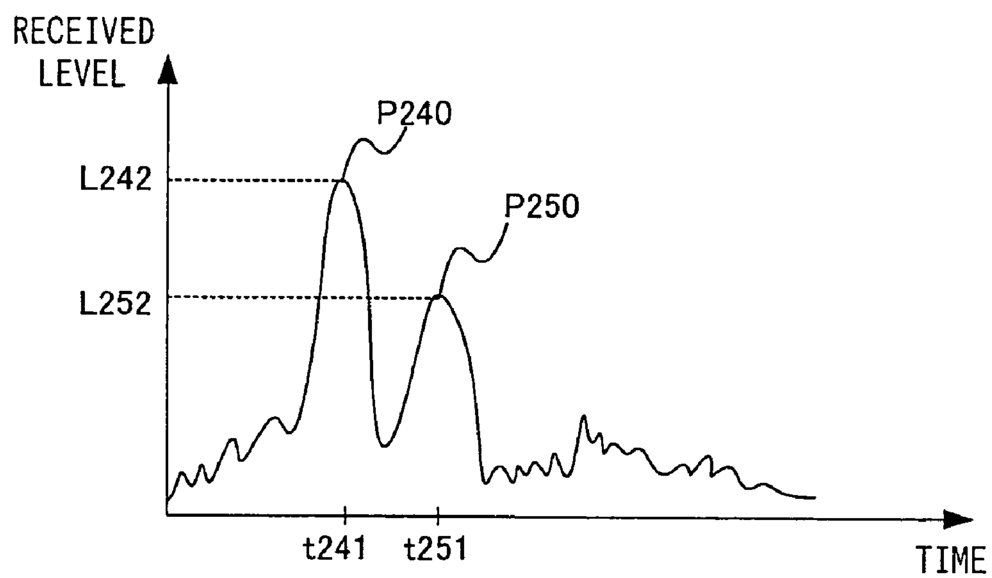
FIG. 2B shows an example of delay profile.

Next, the signal processing in the interference cancellation apparatus of the present embodiment will be described. First, a received signal is multiplied in MF sections 104_a_~104_n_ by each channel's spread code, so as to make a delay profile. FIG. 2A and FIG. 2B show examples of a delay profile. In FIG. 2A and FIG. 2B, the vertical axis denotes the received level and the horizontal axis denotes the time.

The delay profile of FIG. 2A is an example of a delay profile that is obtained by multiplying a received signal by the spread code corresponding to user 1. Similarly, the delay profile of FIG. 2B is an example of a delay profile that is obtained by multiplying a received signal by the spread code corresponding to user 2. In the delay profile of FIG. 2A, valid path P210 is at time t211, path P220 is at t221, path P230 is at time 231, and the rest is interference components and noise components.

Figure 3A:
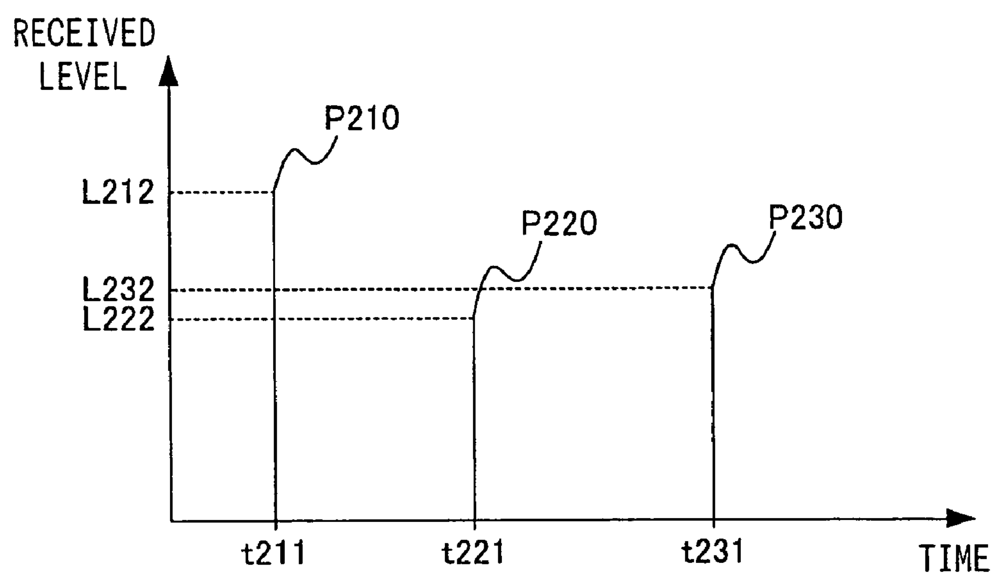
FIG. 3A shows an example of paths selected by the above interference cancellation apparatus of the embodiment.
Figure 3B:
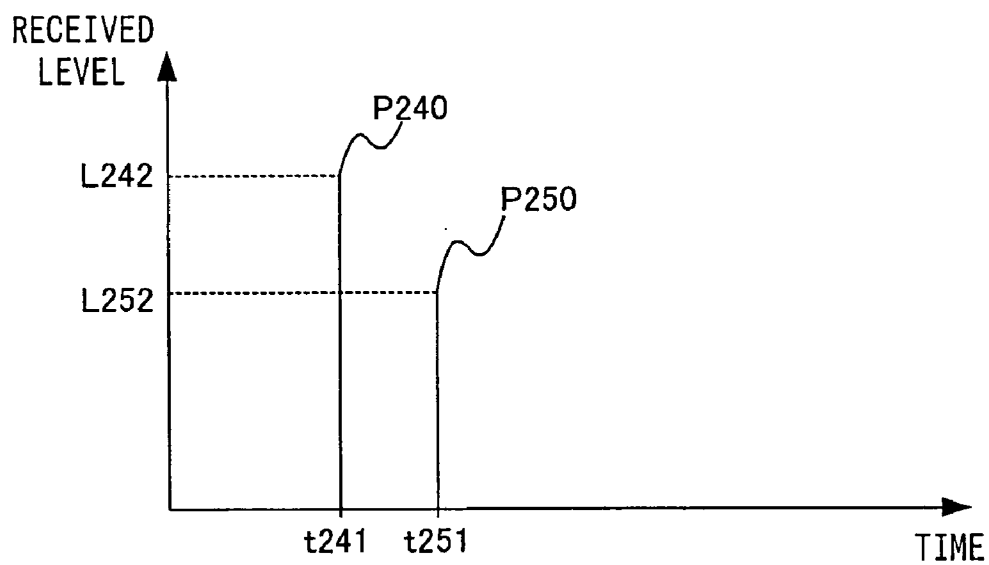
FIG. 3B shows an example of paths selected by the above interference cancellation apparatus of the embodiment.

Similarly, in the delay profile of FIG. 2B, valid path P240 is at time 241 and path P250 is at t251. Path selectors 105_a_~105_n_ select valid paths from FIG. 2A and FIG. 2B that show delay files that include valid paths. FIG. 3A and FIG. 3B show an example of the paths the interference cancellation apparatus of the present embodiment selects. In FIG. 3A and FIG. 3B, the vertical axis denotes the received level and the horizontal axis denotes the time.

FIG. 3A shows a case where valid paths are selected from a received signal from user 1's channel. FIG. 3A shows the selected paths including path P210 with the received level of L212, path P220 with the received level of L222, and path P220 with the received level of L232. Similarly, FIG. 3B shows a case where valid paths are selected from a received signal of user 2's channel. In FIG. 3B, path P240 with the received level of L242 and path P250 with the received level of L252 are selected.

In path selectors 105_a_~105_n_, the channel estimation values of the above valid paths are calculated. Then, JD decoder 106 performs predetermined matrix operation by applying a system matrix to the channel estimation values, and multiplies the matrix operation results by a received signal, so as to obtain demodulation result.

In allocator 107, the demodulation result is separated into channel-specific demodulation signals. These demodulation signals do not include the information on the received level that is included in the valid paths shown in FIG. 3A and FIG. 3B. So in multipliers 108_a_~108_n_, the demodulation signals are multiplied by the received level value and its assigned weight, so that the demodulation signal is reflective of the received level.

For example, a demodulation signal may be multiplied on a per frame basis by the total sum of the powers of selected valid paths. For another example, a demodulation signal may be multiplied on a per frame basis by the square root of the total sum of the powers of selected valid paths.

The received level varies between received signals due to fading. For instance, the impact of fading changes depending on factors such as the time of reception. Accordingly, the reliability of signal differs between a signal received in good condition at a high received level and a signal received in poor condition at a low received level. By means of multiplication using the received level value, a received signal reflects information on the received level, so that error correction decoding such as viterbi decoding that uses the scale of modulation result as likelihood information becomes applicable.

Figure 4:
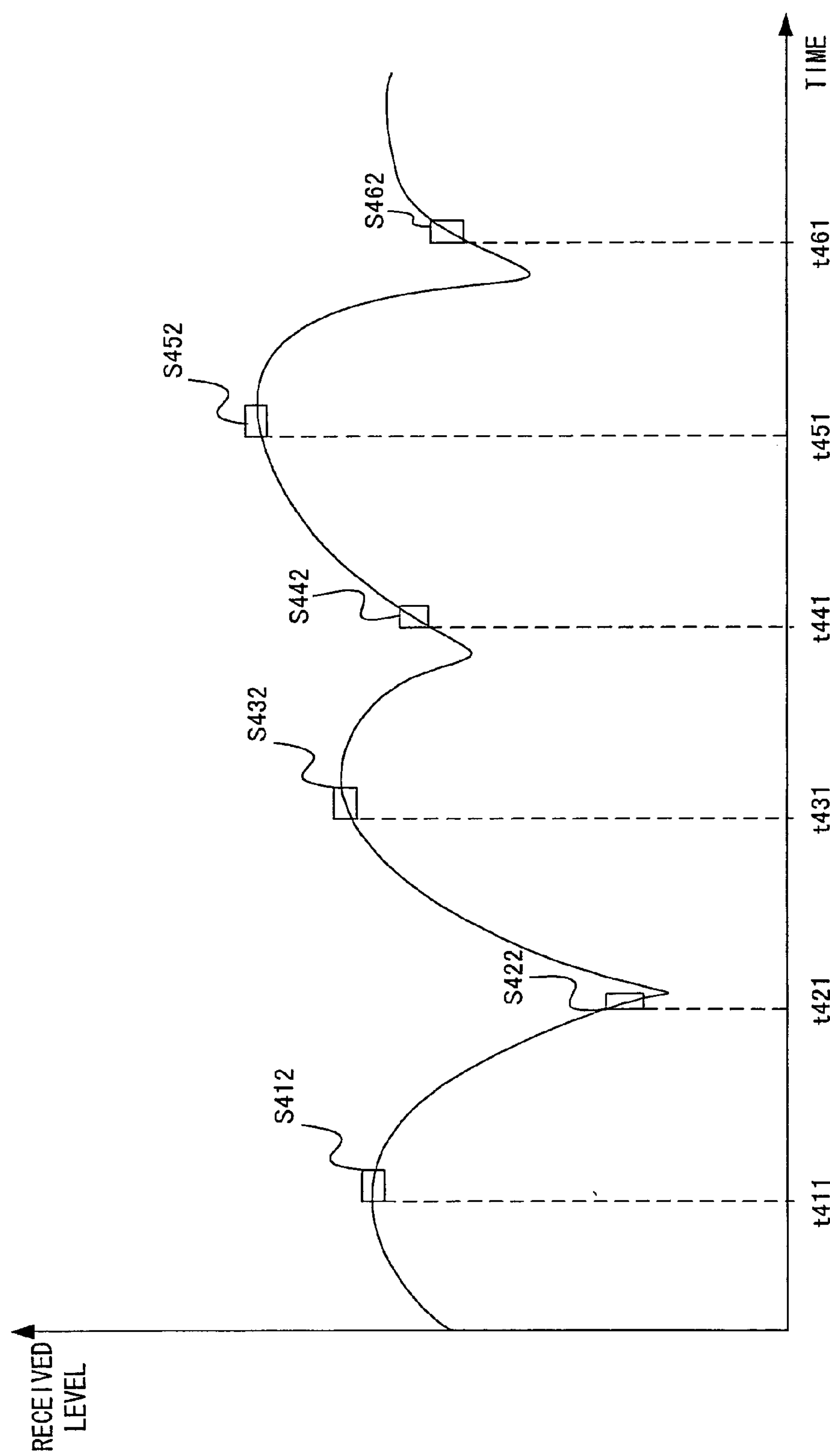
FIG. 4 shows an example of a fluctuating received signal.

FIG. 4 shows an example of a fluctuating received signal. In FIG. 4, the vertical axis denotes the received level and the horizontal axis denotes the time. In FIG. 4, the impact of fading causes the received level of each channel's signal to fluctuate with changes in time. For instance, in communications adopting TDD (Time Division Duplex), a number of time slots are set in one frame and signals from a number of channels are multiplexed. The signals of a particular channel are transmitted in corresponding time slots. In the first frame, S412, which is one time slot of received signals from t411, is received, and time slot S422 from t421 is received in the second frame, and similarly time slots S432, S442, S452, and S462 are received. Here, the signals in time slot S412 get little influenced with fading and the received level thereof is high. In contrast, the signal in time slot S422 gets much faded and the received level thereof is low.

Figure 5:
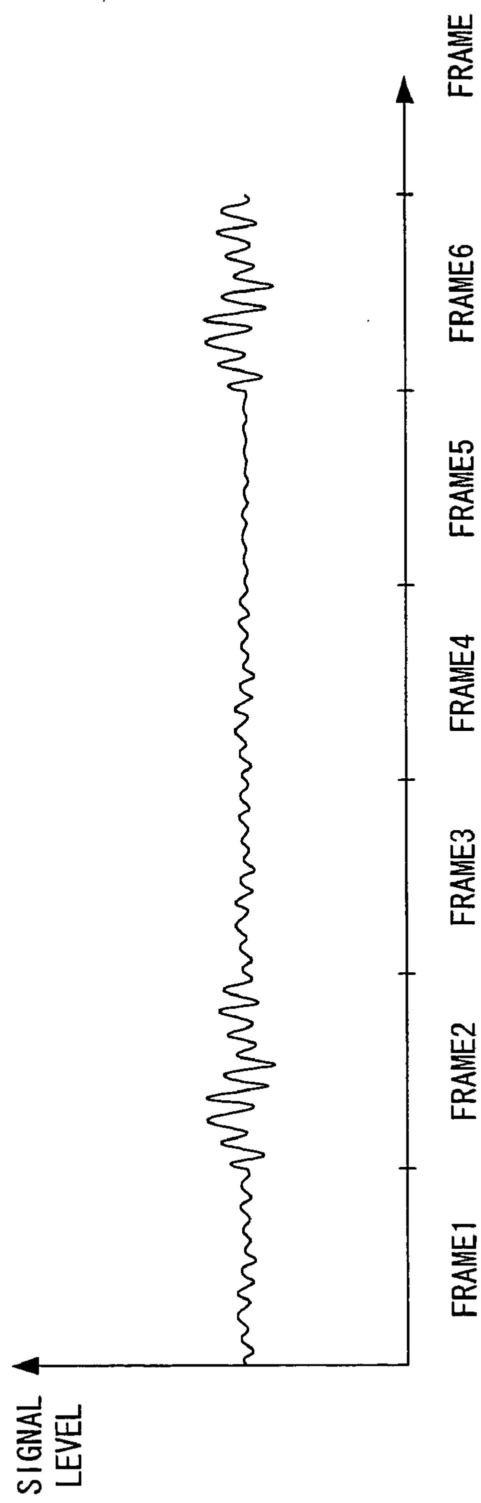
FIG. 5 shows an example of a result of joint detection operation in the above interference cancellation apparatus of the embodiment.

Thus, the received level varies between signals depending on the timing of reception, and the likelihood of the signals also varies. When the above received signals are subjected to joint detection operation, the following will result. FIG. 5 shows an example of a result of joint detection operation in the interference cancellation apparatus of the present embodiment. In FIG. 5, the vertical axis denotes the signal level and the horizontal axis denotes the frames that are received. As shown in FIG. 5, the results of joint detection calculation stay at substantially the same levels without regard to the scale of the received level and thus do not reflect the received level.

The result of demodulating the signals received at t421 has a low received level, and so the demodulation signal has noise thereon.

Figure 6:
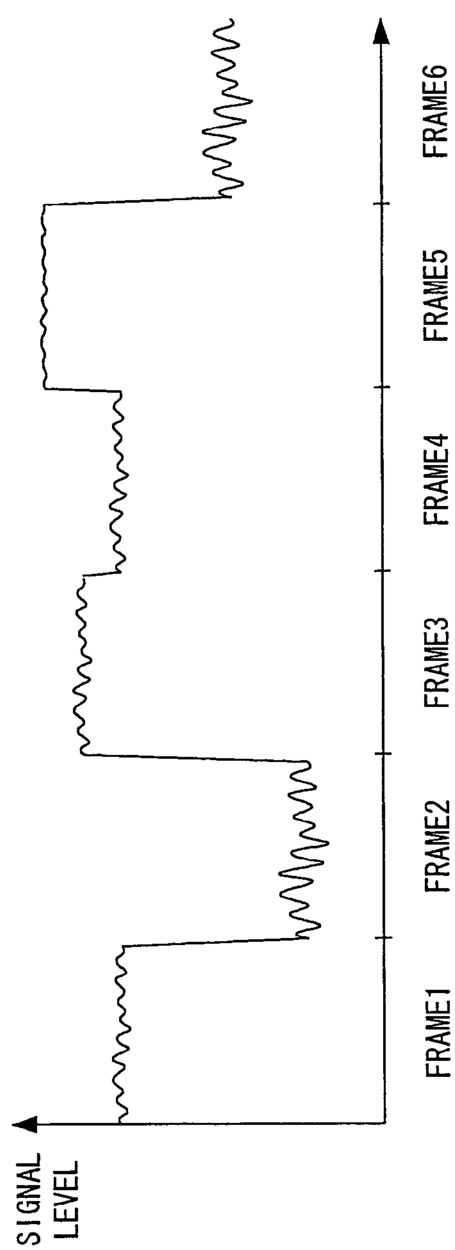
FIG. 6 shows an example of an output result from the above interference cancellation apparatus of the embodiment.

This joint detection operation result is multiplied on a per frame basis by each received level value. FIG. 6 shows an example of an output result from the interference cancellation apparatus of the present embodiment. In FIG. 6, the vertical axis denotes the signal level and the horizontal axis denotes the frames that are received. In FIG. 6, the output of frame 1 is in proportion with the received level of the signals of time slot 412 received at the timing of t411 of FIG. 4. The output of frame 2 is in proportion with the received level of the signals of time slot 422 received at the timing of t421 as in FIG. 4.

Then, error correction decoders 109*a*~109*n*, using the signal level as a soft decision value, performs the hard decision of the received data and obtain demodulation data #1~demodulation data #n of the individual users.

According to the interference cancellation apparatus of the present embodiment, the joint detection decoding result of a received signal gives a result that is reflective of the received level of a received signal, so that, when joint detection decoding results are applied to error correction coding, the accuracy of error correction improves.

Although in the above explanation a demodulation result is assigned weight at an earlier stage than error correction decoders 109*a*~109*n*, this should not be construed as limiting, and the same effect can be achieved by such configuration whereby the weight assignment is performed inside JD decoder 106 using the blocks that correspond to values that are in proportion with the scale of decoding results.

EMBODIMENT 2

A case will be described here with the second embodiment of the invention where reception performance is improved by standardizing the signal level of received signals on a per channel basis, performing joint detection operation, and performing such error correction decoding that uses the received level as likelihood information.

Figure 7:
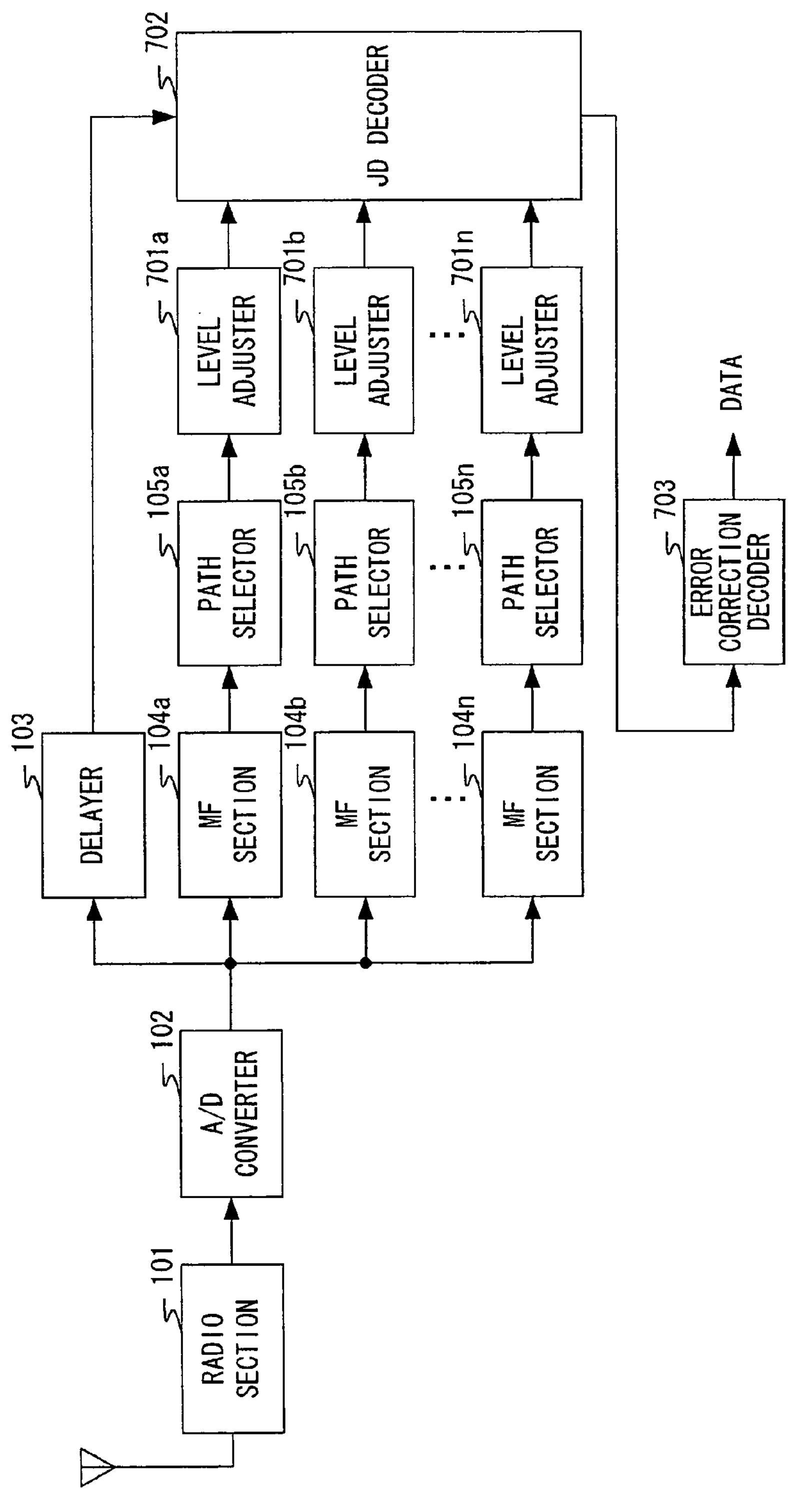
FIG. 7 is a block diagram showing a configuration of an interference cancellation apparatus according to the second embodiment of the invention.

FIG. 7 is a block diagram showing a configuration of an interference cancellation apparatus according to the second embodiment of the invention. Parts in the figure identical to those of FIG. 1 are assigned the same numerals as in FIG. 1 without further explanations.

The interference cancellation apparatus of FIG. 7 comprises level adjusters 701*a*~701*n*, JD decoder 702, error correction decoder 703, and differs from the interference cancellation apparatus of FIG. 1 in that the information on valid paths that is to be input upon joint detection calculation is standardized on a per channel basis.

In FIG. 7, delayer 103 delays a received signal until the processing timing in JD decoder 106, which will be described later. Path selectors 105*a*~105*n* discard the signals other than those corresponding to the valid paths, such as noise, and output the channel estimation values acquired through selection of the valid paths, to level adjusters 701*a*~701*n*. Moreover, path selectors 105*a*~105*n* output the received levels of the valid paths to level adjusters 701*a*~701*n*.

Level adjusters 701*a*~701*n* standardize the valid paths selected in path selectors 105*a*~105*n* according to the received level of the paths, and output information on the standardized valid paths to JD decoder 702. More specifically, level adjusters 701*a*~701*n* divide the valid paths by the sum of the received levels of the valid paths on a per frame basis. For instance, as for the paths of FIG. 3A, P210, P220, and P230 are standardized as in the below equations (1), (2), and (3):

$$L212'=L212/(L212+L222+L232) \quad (1)$$

$$L222'=L222/(L212+L222+L232) \quad (2)$$

$$L232'=L232/(L212+L222+L232) \quad (3)$$

where L212', L222', and L232' respectively denote the received level of standardized P210, P220, and P230.

JD decoder 702 performs predetermined matrix operation using a system matrix, in which the convolutional operation results of the channel estimation values of individual communication terminals (users) and the spread codes assigned to the communication terminals (users) are provided in matrix, multiplies the operation results by the received signal output from delayer 103, and outputs each user's soft decision data wherefrom interference has been canceled to error correction decoder 703. Error correction decoder 703 performs the hard decision of the soft decision data, and obtains decoded data #1~decoded data #n of the users. For example, error correction decoder 703 performs error correction decoding such as viterbi decoding that uses the scale of decoding result as likelihood information.

Figure 8:
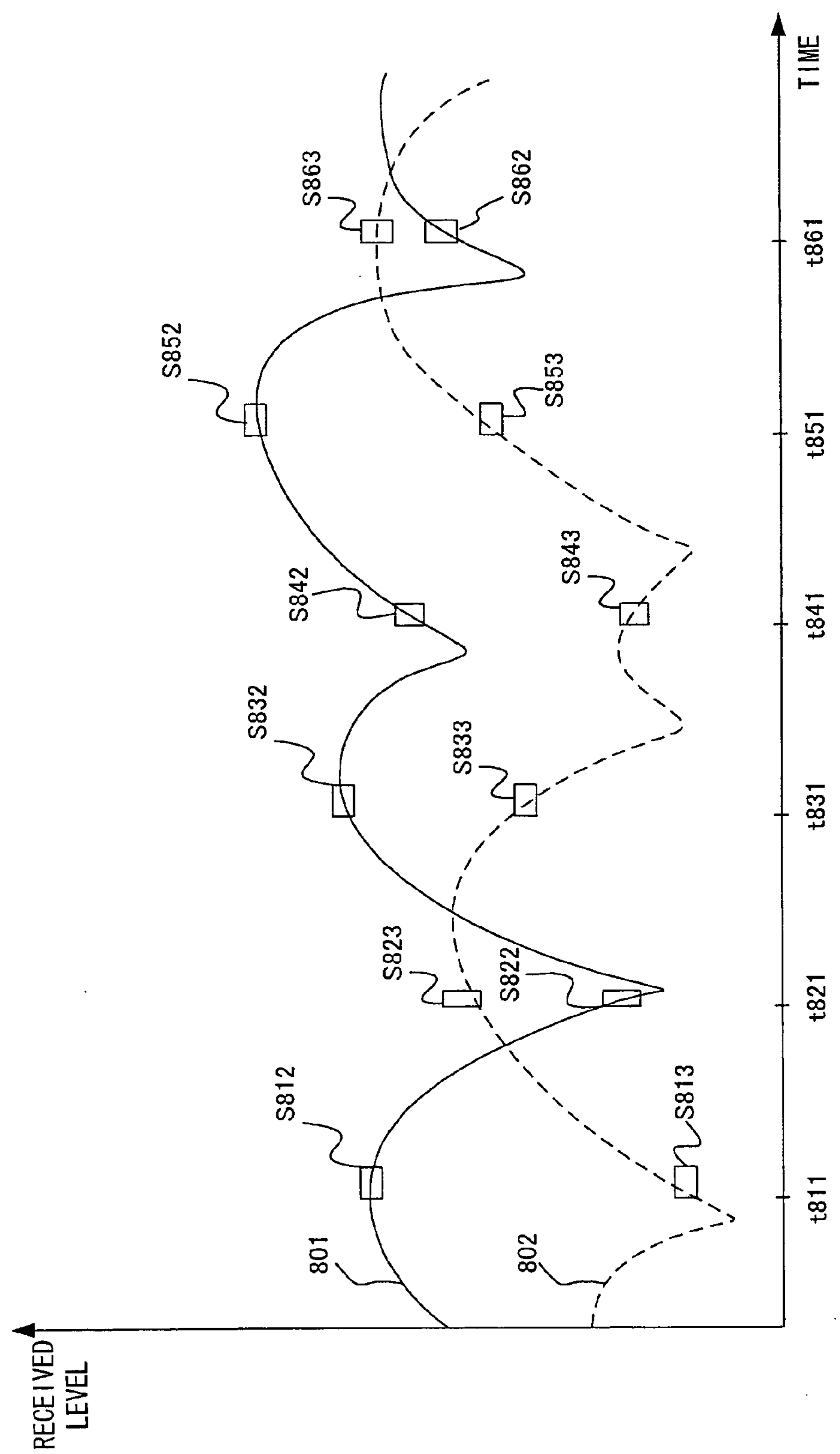
FIG. 8 shows an example of a fluctuating received signal.

Next, the signal processing in the interference cancellation apparatus of the present embodiment will be described. FIG. 8 shows an example of a fluctuating received signal. In FIG. 8, the vertical axis denotes the received level and the horizontal axis denotes the time. In FIG. 8, the impact of fading causes each channel's signal to fluctuate in the received level with changes in time, with 801 denoting the fluctuation of the received level with respect to user 1, and 802 denoting the fluctuation of the received level with respect to user 2. Unlike FIG. 4 that illustrates only one channel signal, with FIG. 8, the explanation extends to a number of channels.

For instance, in communications adopting TDD (Time Division Duplex), a number of time slots are set in one frame and signals from a number of channels are multiplexed. Referring to the signals of user 1's channel, S812, which is one time slot of received signals from time t811, is received in the first frame, time slot S822 from t821 is received in the second frame, and similarly, time slots S832, S842, S852, and S862 are received.

Moreover, referring to the signals of user 2's channel, S813, which is one time slot of received signals from time t811, is received in the first frame, time slot S823 from t821 is received in the second frame, and similarly time slots S833, S843, S853, and S863 are received.

Here, the signals in time slot S812 get little influenced with fading and the received level thereof is high. In contrast, the signals in time slot S822 are much faded and the received level thereof is low. Similarly, the signals of time slot S813 get faded much and the received level thereof is low. In contrast, the signals of time slot S823 get little influenced with fading and the received level thereof is high.

Figures 9A, 9B:
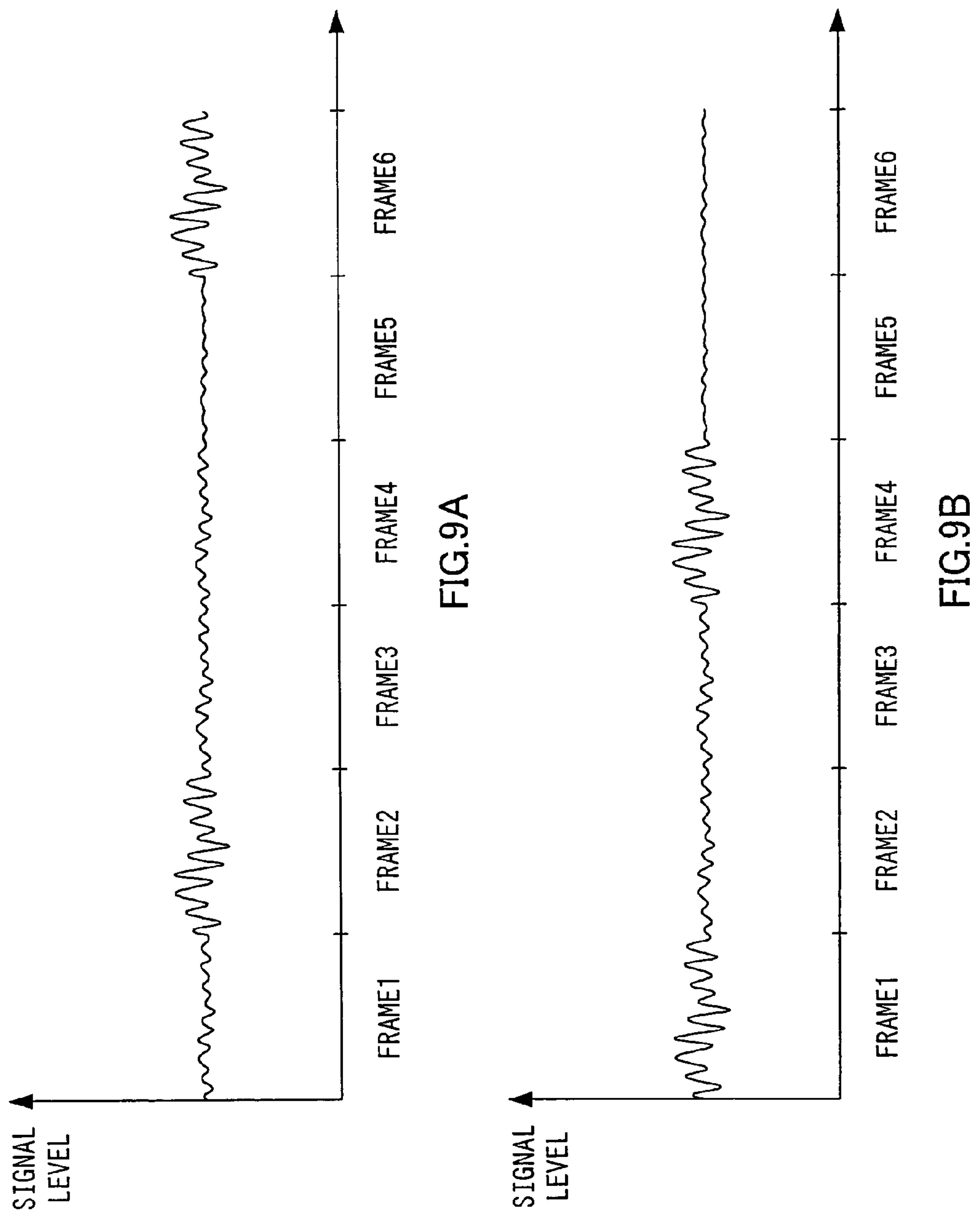
FIG. 9A shows an example of a result of joint detection operation in the above interference cancellation apparatus of the embodiment.
FIG. 9B shows an example of a result of joint detection operation in the above interference cancellation apparatus of the embodiment.

Thus, the received level varies from signal to signal depending on the timing of reception, and the likelihood of the signals also varies. When the above received signals are subjected to joint detection operation, the result will be as follows. FIG. 9A and FIG. 9E show an example of a result of joint detection operation in the interference cancellation apparatus of the previous embodiment. In FIG. 9A and FIG. 9B, the vertical axis denotes the signal level, and the horizontal axis denotes the frames that are received. FIG. 9A shows a joint detection operation result of the signals corresponding to user 1's channel, while FIG. 9B shows a joint detection operation result of the signals corresponding to user 2's channel.

As shown in FIGS. 9A and 9B, these joint detection calculation results stay at approximately the same level without regard to the scale of the received level and thus do not reflect the received level. Referring to channel 1 signal in FIG. 9A, the result of demodulating the signals received at t821 is shown by means of frame 2, and the low received level shows that the demodulation signals contains noise. Similarly, referring to the channel 1 signal in FIG. 9B, the result of demodulating the signals received at t824 is shown by means of frame 4, and the low received level shows that the demodulation signals contains noise.

Figure 10A:
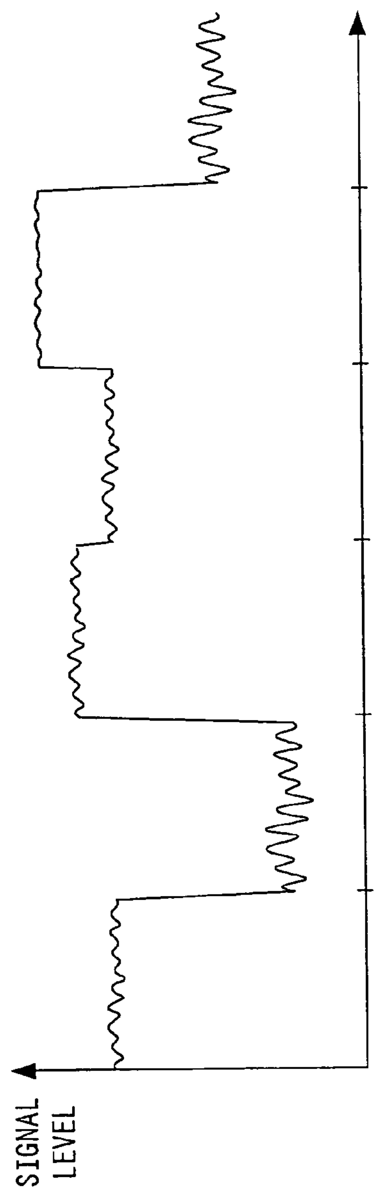
FIG. 10A shows an example of an output result from the above interference cancellation apparatus of the embodiment.
Figure 10B:
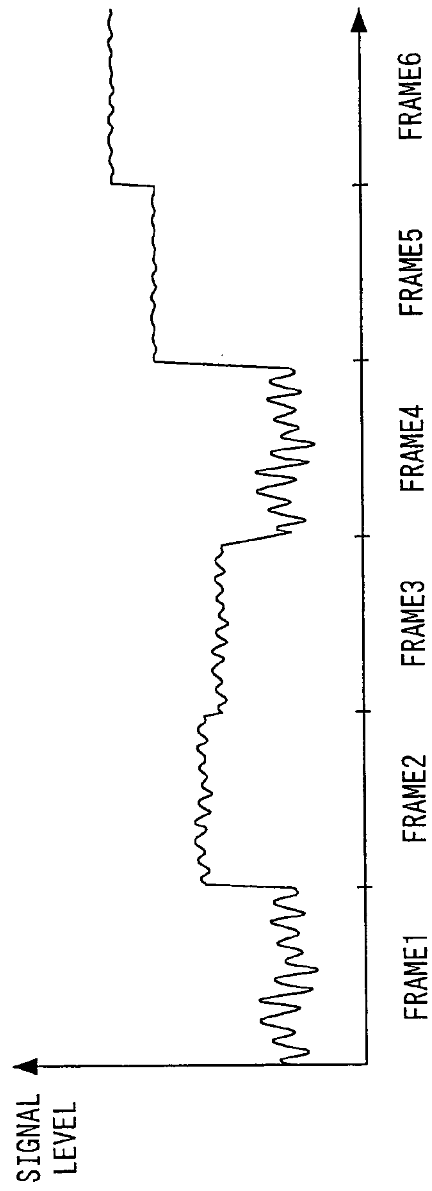
FIG. 10B shows an example of an output result from the above interference cancellation apparatus of the embodiment.

This joint detection operation result is multiplied on a per frame basis by the value of the received level. FIG. 10A and FIG. 10B show an example of an output result from the above interference cancellation apparatus of the present embodiment. In FIG. 10A and FIG. 10B, the vertical axis denotes the signal level and the horizontal axis denotes the frames that are received. A signal of user 1's channel is subjected to joint detection operation and the result thereof is multiplied by the value of the received level, and becomes the signal shown in FIG. 10A. A signal of user 2's channel is subjected to joint detection operation and the result thereof is multiplied by the value of the received level, and becomes the signal shown in FIG. 10B.

In FIG. 10A, the output of frame 1 is in proportion with the received level of the signals of time slot 812 received at the timing of t811 of FIG. 8. The output of frame 2 is in proportion with the received level of the signals of time slot 822 received at the timing of t821 of FIG. 8. Similarly, in FIG. 10B, the output of frame 1 is in proportion with the received level of the signals of time slot 813 received at the timing of t811 of FIG. 8. The output of frame 2 is in proportion with the received level of the signals of time slot 823 received at the timing of t821 of FIG. 8.

Then, error correction decoders 109*a*~109*n*, using the signal levels as soft decision values, performs the hard decision of the received data, and obtain demodulation data #1~demodulation data #n of the individual users.

Thus the interference cancellation apparatus of the present embodiment applies joint detection decoding to received signals of a standardized received path level, so that the accuracy of error detection improves when an error correction decoding scheme is employed that utilizes joint detection decoding results.

Further, the interference cancellation apparatus of the first embodiment needs simple operations such as multiplication of a demodulation result by a value that is in proportion with a received level. However, this multiplication, performed on a per symbol basis, results in a large calculation amount. The interference cancellation apparatus of the second embodiment needs more complex operation for standardization, and yet the calculation amount is small given that the operation is performed using channel estimation values on a per time slot basis.

The interference cancellation apparatus of the present invention achieves the same effect when incorporated in base station apparatus and mobile station apparatus.

Further still, the interference cancellation apparatus of the present invention can adopt such configuration where each above-described block is a circuit, and the circuit that relates to baseband processing is mounted to an IC (Integrated Circuit) such as a DSP (Digital Signal Processor) and LSI (Large Scale Integration), and still achieves the same effect.

As made obvious with the above explanation, according to the interference cancellation apparatus and method of the present invention, a received signal is subjected to joint detection decoding, and the result thereof reflects the received level of the received signal, so that the accuracy of error detection improves when an error correction decoding scheme utilizes joint detection decoding results. Furthermore, according to the interference cancellation apparatus and method of the present invention, a received signal of a standardized received level is subjected joint detection decoding so as to improve the accuracy of error correction when an error correction decoding scheme utilizes joint detection decoding results.

The present application is based on Japanese Patent Application No.2001-242798 filed on Aug. 9, 2001, the entire content of which is incorporated herein by reference.

INDUSTRIAL APPLICABILITY

The present invention is suitable for use of communications apparatus and base station apparatus that receive signals transmitted from a number of communication partners.

The invention claimed is:

1. An interference cancellation apparatus, comprising:

a channel estimator that creates a delay profile for each of a plurality of communication channels and estimates a channel estimation value for each channel based on the corresponding delay profile;

a level adjuster that standardizes each channel estimation value;

a joint detection operator that performs a joint detection operation on the standardized channel estimation values and multiplies the operation result by a received signal to obtain a demodulation result; and an error correction decoder that performs error correction decoding using a scale of the demodulation result as likelihood information.

2. The interference cancellation apparatus according to claim 1, further comprising:

a selector that selects a valid path from the delay profile of each channel, wherein for each channel, the level adjuster standardizes the receive level of the selected valid path.

3. The interference cancellation apparatus according to claim 1, wherein the level adjuster standardizes the channel estimation value for each channel on a per time slot basis.

4. A base station, apparatus comprising an interference cancellation apparatus, said interference cancellation apparatus comprising:

a level adjuster that standardizes each of a plurality of channel estimation values;

a joint detection operator that performs a joint detection operation on the standardized channel estimation values and multiplies the operation result by a received signal to obtain a demodulation result; and an error correction decoder that performs error correction decoding using a scale of the demodulation result as likelihood information.

5. A mobile communication apparatus comprising an interference cancellation apparatus, said interference cancellation apparatus comprising:

a level adjuster that standardizes each channel estimation value;

a joint detection operator that performs a joint detection operation on the standardized channel estimation values and multiplies the operation result by a received signal to obtain a demodulation result; and an error correction decoder that performs error correction decoding using a scale of the demodulation result as likelihood information.

6. An interference cancellation method comprising:

creating a delay profile for each of a plurality of communication channels;

estimating a channel estimation value for each channel based on the corresponding delay profile;

standardizing each channel estimation value;

performing a joint detection operation on the standardized channel estimation values;

multiplying the joint detection operation result by a received signal to obtain a demodulation result; and performing error correction decoding using a scale of the demodulation result as likelihood information.

* * * * *